Ted I. Haney
Henry L. Warner
INVENTOR.

(a) 
(b)
(c)
(d)
(e)
(f)

(a) 
(b)
(c)
(d)
(e)
(f)

Ted I. Haney
Henry L. Warner
INVENTOR.

BY
Dox A. Doty
Attorney

United States Patent Office 3,469,230
Patented Sept. 23, 1969

3,469,230
SONAR SYSTEM
Ted I. Haney and Henry L. Warner, Panama City, Fla.,
assignors to the United States of America as represented
by the Secretary of the Navy
Filed Feb. 8, 1968, Ser. No. 704,069
Int. Cl. G01s 9/66
U.S. Cl. 340—3                                    9 Claims

ABSTRACT OF THE DISCLOSURE

A sonar system having a transmitting channel and a pair of receiving channels, with the receiving channels each including a transducer, a time-varied-gain amplifier, a filter, and a tunnel diode switch. One of said receiving channels further includes a delay line and amplifier which is coupled between the output of its tunnel diode switch and the intensity input of a readout, while the other of said receiving channels further includes a horizontal sweep generator which is connected between the output of its tunnel diode switch and the horizontal sweep circuit of said readout for the timely triggering thereof. The aforesaid transmitting channel is connected to the vertical sweep circuit of said readout, likewise for the timely triggering thereof.

---

The invention described herein may be manufactured and used by or for the Government of the United States of America for governmental purposes without the payment of any royalties thereon or therefor.

The present invention relates generally to echo-search-ranging systems and, in particular, is an improved sonar system for detecting, identifying, and determining the range and bearing of subaqueous targets, such as objects located within sea water or laying on or buried in the sea floor.

In locating underwater targets by means of acoustical echo-search systems, it is important to accurately determine the direction from which target reflected echoes are received. Heretofore, sonar systems incorporating a pair of receiving transducers of known disposition and orientation have been used in such manner that incoming target echoes strike them simultaneously if the source thereof lies on the bisector of their receiving faces. In such case, the electrical output signals therefrom would be in phase. On the other hand, in the event said target echoes impact upon the receiving faces of said transducers at different times, the electrical signals produced thereby would be out of phase, and the phase difference therebetween would be proportional to the angular deviation from said bisector, with the polarity sign thereof representative of the direction of said deviation from said bisector.

The prior art devices incorporating the aforementioned operational principle are, for the most part, rather complex phase comparison systems, compared to the subject invention which, likewise, makes use of said principle. Accordingly, the subject invention constitutes an improvement thereover, especially from the structural and operational standpoints.

In the past, for example, sector scan indicator and bearing deviation techniques were employed in systems which use the horizontal sweep of a cathode ray tube to obtain the scan. This sweep was derived from the difference frequency effected by heterodyning the received channel frequencies with local oscillators respectively associated therewith. Since this difference frequency is sinusoidal by nature, the resulting horizontal sweep has a constant period. And with the application of a vertical sweep to the display—usually associated with range and triggered by the transmitter—a raster is generated consisting of a plurality of horizontal lines that are substantially equally spaced in the vertical direction. This situation is, of course, satisfactory if and only if a continuous sine wave is received at the hydrophones. The sector scan indicator technique then displays a narrow line from top to bottom of the cathode ray tube face, with its position in the horizontal direction indicating the phase difference of the signal in the receiver channels. However, if a pulse is transmitted to obtain range information and is reflected from a series of more or less complex targets, the received waveform is no longer sinusoidal or even periodic. The result is an undesirable broadening of the target width on the display, due to the fact that the horizontal trigger occurs periodically, whereas the intensity information derived from a mixing of the receiver channels is not periodic.

Moreover, most prior art sonar methods use either the amplitude of the direct detected signal to modulate the brightness of the display, or if limiting or switching is used in the information channels, gating or modulating the phase information with amplitude signals derived from preamplifier or low level signal circuits is employed.

The subject invention overcomes many of the disadvantages of the aforementioned prior art devices, in that the fidelity of the target display is considerably improved, as a result of the new structural combination incorporated therein.

It is, therefore, an object of this invention to provide an improved echo-search-ranging system.

Another object of this invention is to provide an improved sonar system.

Still another object of this invention is to provide a simple scanning sonar which can be operated from small boats or other vehicles to detect underwater targets.

A further object of this invention is to provide an improved rapid acting sonar system which utilizes one receiver channel output to trigger the horizontal sweep of a display and another receiver channel output to brighten the display one time for each horizontal sweep.

A further object of this invention is to provide an echo-search-ranging system in which the effective size of the beamwidth is determined by the duration of the intensity pulse on the display.

Another object of this invention is to provide an improved sonar system which has a repetition or sweep rate that is automatically controlled by the individual ping periods.

Another object of this invention is to provide an improved method and means for using a signal delay in a sonar receiver intensity channel to produce a display which is effectively centered on the perpendicular bisector of the receiving transducer axis thereof.

Another object of this invention is to provide an improved echo-search-ranging system in general and a sonar system in particular that are easily and economically manufactured, stored, operated, and maintained.

Other objects and many of the attendant advantages will be readily appreciated as the subject invention becomes better understood by reference to the following detailed description, when considered in conjunction with the accompanying drawings wherein.

Figure 1:
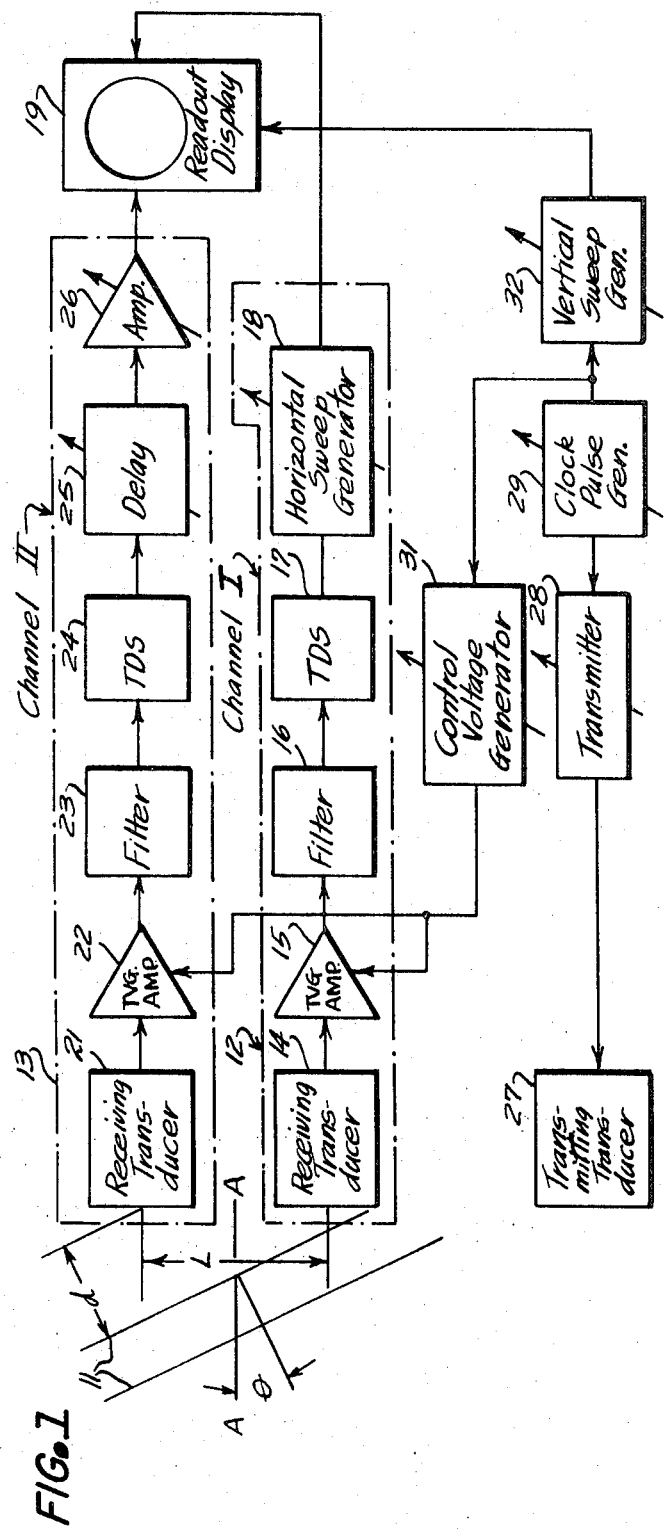
FIG. 1 is a block diagram of the subject invention.
Figure 3:
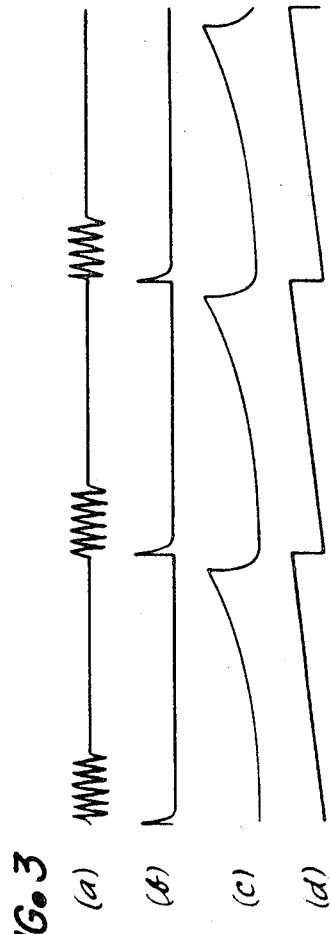
Figure 4:
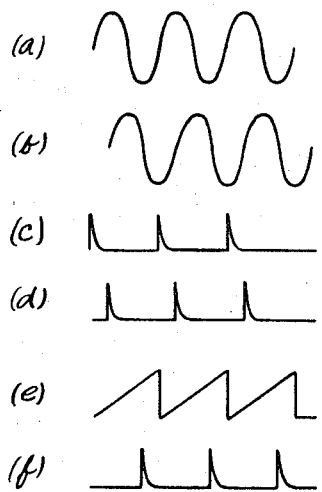
Figure 6:
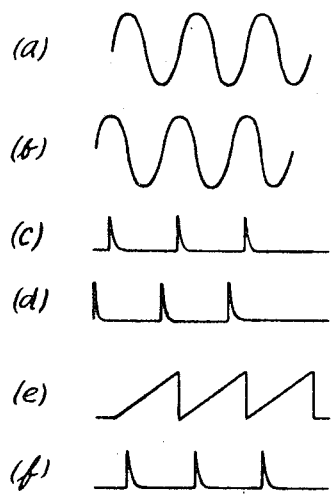
Figure 5:
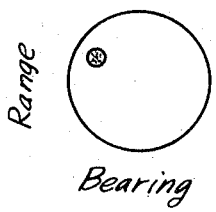
Figure 7:
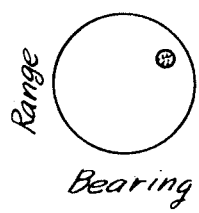

FIG. 3 graphically illustrates representative waveforms occurring at the outputs of the various components involved in and associated with the transmitting portion of the subject invention;

FIG. 4 graphically illustrates representative waveforms occurring at the outputs of the various components involved in and associated with the receiving channels of the subject invention whenever the target echo wavefront arrives from the direction illustrated in FIG. 1;

FIG. 5 pictorially represents the display on the face of the readout when the incoming target echo is arriving from the direction shown in FIG. 1;

FIG. 6 graphically illustrates representative waveforms occurring at the outputs of the various components involved in and associated iwth the receiving channels of the subject invention whenever the target echo wavefront arrives from a direction which causes it to impact upon the receiving transducer of channel II first; and FIG. 7 pictorially represents the display on the face of the readout when the incoming target echo impacts upon the receiving transducer of channel II first.

Referring now to FIG. 1, there is shown in block diagram form the overall system constituting this invention. Shown in conjunction therewith are wavefronts 11 which are approaching the receptors of the invention at a typical approach angle herewith represented as the angle θ between the perpendicular bisectors of the receptors and a line normal to said wavefronts 11.

In this particular case, the subject invention includes a pair of receiving channels 12 and 13. Receiving channel 12 contains a receiving transducer 14, the output of which is coupled to the input of a time-varied-gain amplifier 15. The output of time-varied-gain amplifier 15 is coupled through a filter 16 to the input of a tunnel diode switch 17, which will be discussed more fully in the discussion of FIG. 2. The output of tunnel diode switch 17 is connected to the input of a horizontal sweep generator 18, with the output therof connected to the horizonal sweep of a readout 19.

The aforementioned channel 13 includes a receiving transducer 21, with the output thereof connected through a time-varied-gain amplifier 22 and a filter 23 before being connected to the input of a tunnel diode switch 24. Tunnel diode switch 24 is substantially identical to the aforementioned tunnel diode switch 17 and will, likewise, be discussed more fully during the discussion of the device of FIG. 2. The output of tunnel diode switch 24 is coupled to the input of a delay 25, which may be a delay line or any other suitable type delay device. The output of delay 25 is connected through a variable amplifier 26 to the intensity input grid of the aforementioned readout 19.

The transmitting portion of the subject invention consists of a transmitting transducer 27, the input of which is connected to the output of an adjustable frequency transmitter 28, which, in turn, is timely energized by clock pulse generator 29.

The output of clock pulse generator 29 takes two paths, one of which is provided by the output there of being connected to the input of a control voltage generator 31, with the output thereof connected to the conrol inputs of the aforesaid time-varied-gain amplifiers 15 and 22 of channels I and II of the receiving portion of the invention. The other of said paths is that formed by the output of clock pulse generator 29 being connected to the input of a vertical sweep generator 32, which has its output connected to the vertical sweep circuit of the aforementioned readout 19.

Figure 2:
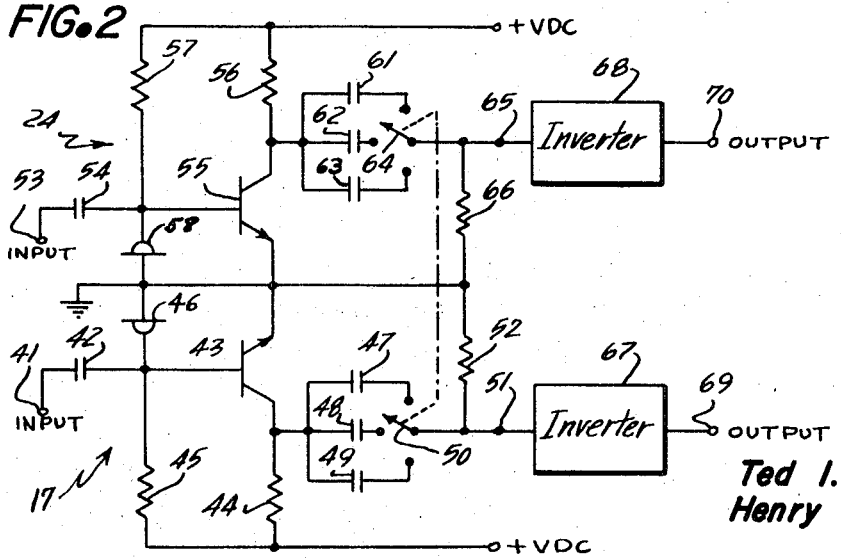
FIG. 2 is a schematic electrical diagram of exemplary tunnel diode switches which may be used as the tunnel diode switches in the system of FIG. 1.

As previously mentioned, the device of FIG. 2 merely illustrates an electrical structure which may be incorporated in the subject invention as tunnel diode switches 27 and 24. However, it should be understood that any other conventional type of tunnel diode switches which effect rapid rise pulses as a result of zero-crossing signals being applied thereto may be employed for this purpose, too.

In this particular representative embodiment of tunnel diode switches, the output of the aforementioned filter 16 is applied to an input terminal 41 which, in turn, is connected through a capacitor 42 to the base of an NPN transistor 43. The emitter of transistor 43 is directly connected to ground, and the collector thereof is connected through a resistor 44 to a positive direct current voltage. A tunnel diode 46 is connected between the base of said transistor 43 and ground, with the cathode therof connected to said base and the anode thereof connected to said ground. The output of transistor 43 is taken from the collector thereof and is connected to one of the plates of each of a trio of capacitors 47, 48, and 49. The other plates of said capacitors 47, 48, and 49 are connected through a selector switch 50 to a terminal 51 which is also connected through a resistor 52 to the aforementioned ground.

As previously indicated, tunnel diode switch 24 is substantially identical to tunnel diode switch 17, and, therefore, the respective components thereof are substantially identical, as well.

The input to tunnel diode switch 24 is an input terminal 53, which is the terminal that is connected to the output of the aforementioned filter 23 of channel II of the receiving portion of the invention. Input terminal 53 is coupled through a capacitor 54 to the base of another NPN transistor 55. The emitter of transistor 55 is directly connected to ground, and the collector thereof is connected through a resistor 56 to a positive direct current voltage which is substantially identical to the aforementioned positive direct current voltage. A tunnel diode 58 is connected between said transistor 55 and said ground in such manner that the cathode thereof is connected to the base of said transistor 55 while the anode thereof is connected to said ground. The output of transistor 55 is taken from the collector thereof and is coupled through a trio of capacitors 61, 62, and 63 to a selector switch 64, the output of which is connected to another terminal 65. Terminal 65 likewise has a resistor 66 coupled between it and the aforesaid ground.

For reasons which will be discussed subsequently, the trio of capacitors in tunnel diode switch 17 each have different capacitances. Of course, the trio of capacitances shown in tunnel diode switch 24 also have different capacitances, but each thereof is respectively identical to the comparable capacitances of the trio of capacitances of tunnel diode switch 17. As may readily be seen, such design effects balance between the two tunnel diode switches whenever the movable arms of selector switches 50 and 64 are ganged together, as is shown in this preferred embodiment of this invention.

It should be understood that any suitable tunnel diode switch circuits may be incorporated in this invention that has either negative-going or positive-going zero-potential crossing response characteristics. And, of course, such circuitry may be incorporated therein or associated therewith as will produce either negative or positive pulses in the outputs thereof. In this particular disclosed arrangement, tunnel diode switches 17 and 24 are intended to respond to the zero crossings whenever the input signals supplied thereto are changing from negative to positive in voltage, as ideally represented by the waveforms of FIGS. 4(a) and 4(b) and FIGS. 6(a) and 6(b). Because in this particular instance it has been found to be desirable to have the outputs of tunnel diode switch circuits 17 and 24 to have positive pulse outputs—as is typically represented by FIG. 4(c) and FIG. 4(d) and FIG. 6(c) and FIG. 6(d)—a pair of inverters 67 and 68 are respectively connected to terminals 61 and 65. Obviously, one skilled in the art having the benefit of the teachings herewith presented could design tunnel diode switches 17 and 24 to respond to any desired input signals, as well as to produce any desired output signals in response thereto. As designed in the device of FIG. 2, the outputs of inverters 67 and 68 are respectively connected to output terminals 69 and 70, which, in turn, are connected to the inputs of the aforementioned horizontal sweep generator 14 and delay 25 of the receiver portion of the subject invention.

The operation of the invention will now be discussed briefly as follows:

Acoustical signal bursts or pings having lengths $T_p$ and a frequency $f_c$, similar to that ideally depicted in FIG. 3(a), are broadcast throughout the subaqueous target search area by transducer 27, as a result of its being timely energized by transmitter 28. Transmitter timing is programmed by the pulses illustrated in the waveform of FIG. 3(b), which are timely generated by adjustable master clock pulse generator 29. Of course, said pulses also trigger adjustable control voltage generator 31 to cause the control voltage to be applied to time-varied-gain amplifiers 15 and 22. The waveform of FIG. 3(c) is one which is typically used for this purpose. It is usually preset to have the voltage variation determined by the geometry of the system placement, although others may also be selected, if the operational circumstances so warrant. Obviously, the making of such selection would be well within the purview of one skilled in the art having the benefit of the teachings herewith presented.

The clock pulses of generator 29 also trigger vertical sweep generator 32 which, in turn, controls the vertical sweep of readout 19 in accordance with the waveform ideally illustrated in FIG. 3(d). Hence, the vertical sweep of the cathode ray tube of readout 19 is synchronized with the broadcast signals.

Upon contact with a target, said acoustical signals are reflected back as echoes through the water to the receiving portion of the invention and, in particular, to the receiving transducers thereof.

Receiving transducers 14 and 21 are preferably mounted in the same plane, with a spacing L therebetween determined by the desired search sector size $\beta$ and the wavelength of the broadcast frequency $f_c$. Of course, acoustical echo signals returned from target objects are received by the receiving transducers at the same time if the target lies on an extension of the perpendicular bisector thereof. Such bisector is indicated as line A—A in FIG. 1 and is used as a reference line by this invention. On the other hand, in the event the target echoes arrive from some other direction—for instance, from the direction indicated by wavefronts 11—there will be a relative time delay between initial wavefront impacts upon the receiving transducer faces which may be calculated by the equation:

$$T = \frac{L \sin \theta}{c} \quad (1)$$

where

T = time delay in seconds,
c = speed of sound in water in feet per second,
L = the distance between the centers of the transducer faces in feet, and
$\theta$ = the bearing angle to the target in degrees.

The electrical signals produced by electroacoustical transducers 14 and 21 as result to the target echoes impacting thereon are somewhat similar to those originally broadcast but may contain unwanted ambient medium and other environmental modulations. They are amplified to an optimum useful level regardless of the target range by means of time-varied-gain amplifiers 15 and 22, respectively. They are then filtered by filters 16 and 23 to extract said unwanted modulation or other spurious frequencies, whereby they acquire phase related waveforms similar to those illustrated in FIG. 4(a) and FIG. 4(b)—which, in this instance are enlarged versions of the transmitted acoustical burst or ping signals of FIG. 3(a).

These filtered signals are then timely applied to tunnel diode switches 17 and 24, respectively, for the generation of rapid-rise marker pulses at the instant the positive slopes of each cycle thereof crosses a zero potential. Hence, due to the signal processing within the circuitry of the device of FIG. 2, such zero-crossings effectively produce the pulses of the signal waveforms shown in FIG. 4(c) and FIG. 4(d), with said pulses of the former leading said pulses of the latter by an amount of time T proportional to target bearing angle $\theta$ in accordance with the aforementioned Equation 1. Because tunnel diode switches 17 and 24 have ben employed to timely generate the pulses of the waveforms of FIG. 4(c) and FIG. 4(d), they are very sharp, and, thus, more accurate phase relationships are effected within and used by the subject invention.

The output pulses of tunnel diode switch 17 are employed to timely trigger the horizontal sweep generator 18, which provides a linear horizontal sweep for readout 19, thereby starting the display only when a target echo is actually received. The duration of said linear horizontal sweep is determined by the period of the transmitted signal and is defined by the equation:

$$T_s = \frac{1}{f_c} \quad (2)$$

where $T_s$ = sweep perior in seconds, and
$f_c$ = frequency of transmitted signal in cycles per second.

To provide correlation of the angular displacement of the actual target from its predetermined reference (say, line A—A of FIG. 1) with the displacement of the target shown on the display, the horizontal sweep of the readout must originate on the side thereof opposite to the particular channel employed for triggering the sweep signal. For example, if the left channel (channel I of FIG. 1) is used to trigger the sweep signal, the sweep should be from right to left on the display. Of course, the invention may also be designed to have the right hand channel (that is, channel II) act as the sweep tiggering channel, and in such case, the sweep should be from left to right on the display.

The target indicator pulse channel (channel II of FIG. 1) has delay line 25 incorporated therein, in order to insure that the target marker pulse obtained from tunnel diode switch 24 will always be displayed after the sweep has been triggered, regardless of which receiving transducer receives the incoming target echo first. The amount of delay effected by delay line 25 is preferably a period of time corresponding to half the horizontal sweep period—that is, $T_s/2$—in order to provide centering for the display. Of course, as depicted in FIG. 1, the delayed pulse output from delay line 25 is amplified to a more useful level by adjustable amplifier 26, before being applied to the intensity grid input of readout 19 for providing a small spotlike intensity modulation on the display thereof. Of course, the displacement of said spot to the left or to the right of the preset display reference position (as determined by the amount of delay added by delay line 25, but usually the center of the scope) indicates the left or right bearing of the incoming target echo with respect to the aforesaid axis A—A or the like.

The intensity of the target indicating spot on the display is, in actuality, determined by the number of individual display pulses occurring at nearly the same place on a display screen having a given persistency, so that they all contribute energy to the same resolution element thereof, as exemplarily illustrated in FIG. 5.

If desired, the subject sonar may be so designed as to have a fixed voltage intensity pulse associated with each cycle of the received wavefronts. Then, for a strong target echo, compared to other signals, the received wavefronts will arrive from the direction of the target so that all intensity pulses occur the same period of time after the sweep trigger. This provides a compact, bright spot on the display, since the vertical (range) sweep is about $10^5$ times longer than the horizontal sweep.

For weaker target echoes compared to other signals, such as noise and reverberation, the angle of arrival of the echo wavefronts at the receiving transducers fluctuate from time to time. This causes the fixed intensity pulses to fall further apart on the screen and, thus, the target spot appears less bright. This technique is far simpler than using amplitude gates, etc., to restore a voltage level to the intensity pulse related to the absolute signal level, especially since the latter mentioned techniques must be largely by-passed in the practical display by some type of automatic gain control to keep the signal levels within a range that can be handled by the readout.

In the event the target echo wavefronts are arriving from such a direction that they impact first on transducer 21—the receiving transducer of non-horizontal sweep triggering channel II—the signal waveforms of FIG. 6 may be effected. Hence, in such case, there would be a phase difference between the waveforms of FIG. 6(a) and FIG. 6(b), with that of FIG. 6(a) being that generated by transducer 21 while that of FIG. 6(b) being that benerated by transducer 14. Then the pulses of FIG. 6(c) and FIG. 6(d) would be produced by tunnel diode switches 24 and 17, respectively. Of course, the sweep sawtooth signals of FIG 6(e) would be generated prior to the delayed intensity pulses of FIG. 6(f), due to the fact that the target echo pulses of FIG. 6(d) are appropriately delayed by delay line 26 before being applied to the intensity grid input of readout 19. Hence, they timely occur during the occurrence of the readout sweep signals and produce a bright spot on the display screen which is indicative of target bearing. Such a display is exemplarily illustrated by FIG. 7.

Because tunnel diode switches 17 and 24 are essentially identical in structure (as may be readily seen in FIG. 2), only the operation of tunnel diode switch 17 will herewith be discussed.

In this particular embodiment, the inputs thereto are the substantially sine wave type of signals similar to those ideally represented by the waveforms of either FIGS. 4(a) and (b) or FIGS. 6(a) and (b). The actuator point or operator portion thereof is intended to proximate the zero-crossing of the positive-going portions of said signals; however, since an actual zero-crossing operator ostensively is not as yet perfected within the state of the tunnel diode art, an exceedingly close approximation thereof (such as, for example, fifteen millivolts) will be used in this case, and it will, thus, herein be defined as said zero-crossing, because for all practical purposes, that is what it is. Accordingly, if the positive-going portions of the input sine waves are applied to the input of tunnel diode switch 17, tunnel diode 46 rapidly changes from an essentially non-conductive state (that is, a very low conductive state) to a more conductive state at approximately the aforesaid zero-crossing. Hence, in this particular instance, the bias voltage applied to the base of transistor 43 effectively becomes zero voltage, at which time it rapidly changes its state from non-conductive to conductive. When this change of state occurs, the collector of transistor 43 very rapidly changes in potential to a less positive voltage, which, of course, is then supplied to the selected one of the capacitors of a differentiator composed of operatively associated capacitors 47, 48, or 49 and resistor 52. Of course, the signal differentiation effected thereby produces negative-going positive output pulses which have the inverted waveforms of all the pertinent pulse waveforms of FIG. 4 and FIG. 5. Hence, by inverting them in inverter 67, they are converted into positive-going positive pulses which are more useful as inputs to associated circuitry, as the preferred embodiment of the subject invention is herewith portrayed.

As previously suggested tunnel diode switches 17 and 24 should be designed to be substantially identical in structure and performance, so all of the output signals contain similar type positive-going positive pulses that are timely applied to the inputs of the respective inputs of the components connected thereto.

It should be understood that, within reason, the design parameters and the design of the structure of the subject invention may be varied as necessary to provide optimum operation for any particular conditions. For example, it has been found that the subject system will provide a search sector of the size $\beta$ which may be determined by the relationship:

$$\sin \beta = \frac{c}{2f_c L} \quad (3)$$

where $\beta$=the search sector in degrees,
$c$=the velocity of sound in water in feet per second,
$L$=the distance between the centers of the transducer faces in feet, and
$f_c$=transmitted signal frequency in cycles per second.

Thus, it may readily be seen that by varying or adjusting $f_c$ or L the sector size may be controlled.

Moreover, it has been found that the determination of target bearing angle, $\theta$, is dependent on the signal-to-noise ratio of the echo return from the target object; and for an ideal point target, the bearing resolution, $R_0$, is determined by the width of the intensity marker, $T_{mp}$, and may be obtained from the expression:

$$R_0 = f_c T_{mp} \beta \quad (4)$$

where $R_\theta$=target bearing resolution,
$f_c$=transmitted frequency in cycles per second,
$T_{mp}$=width of intensity marker pulse in feet, and
$\beta$=search sector in degrees.

From this expression, it may readily be seen that the narrow-width marker pulses obtained from the use of tunnel diode switches 17 and 24 improves the overall resolution characteristics of the invention to a considerable extent.

Because range resolution is dependent on the length of the transmitted ping, it may be improved by the proper selection thereof in accordance with the design relationship:

$$R_r = \frac{c}{2T_p} \quad (5)$$

where $R_r$=range resolution,
$c$=velocity of sound in water in feet per second,
$T_p$=ping length in feet.

The ambiguous bearing intervals that occur when $d=n\lambda$ (where $n$ is an integer and $\lambda$ is equal to the wavelength of the transmitted signal) may be suppressed in a number of ways. The most straight forward suppression method is to utilize the beam pattern of the transmitting transducer to provide angular amplitude discrimination. If the pattern is designed so that a null of the projector pattern falls at the first ambiguity angle, then all further ambiguities will be sufficiently suppressed This may be accomplished by calculating the first ambiguity angle using the equation:

$$\sin \theta_{a1} = \frac{\lambda}{L} \quad (6)$$

where $\theta_{a1}$=the first ambiguity angle in degrees,
$\lambda$=wavelength of transmitted signal in feet,
$L$=distance between the face centers of receiving the receiving transducers in feet.

From the foregoing, it may readily be seen that the system depicted in FIG. 1 may be optimized by making the proper design choices therein and in conjunction therewith and that so doing improves the operational characteristics thereof for any given operational circumstances.

Also, as previously suggested, although the preferred embodiment described in detail is defined as a sonar system which implies that the environmental medium is water, sea water, or some other subaqueous medium, it should be understood that with proper design of the various parameters and components thereof, it may be used to an advantage in other environmental mediums, such as, for instance, in the gaseous atmosphere of the earth or in space. Obviously, the making of such design choices would be well within the purview of one skilled in the art having the benefit of the teachings herewith presented and, hence, so doing would not violate the spirit and scope of the invention.

It should be further understood that all of the elements and components herein respectively disclosed in block diagram or schematic diagram form are conventional and well known in the art, and that it is their unique interconnections and interactions that effect the improved system constituting this invention.

Obviously, other embodiments and modifications of the subject invention will readily come to the mind of one skilled in the art having the benefit of the teachings presented in the foregoing description and the drawings. It is, therefore, to be understood that this invention is not to be limited thereto.

What is claimed is:

1. A target bearing determining system comprising in combination:
    transducer means responsive to predetermined received wave energy for generating a pair of electrical signals having a phase relation which varies in accordance with the direction from which said wave energy is propagating relative to a predetermined axis of directivity;
    tunnel diode switch means effectively connected to the outputs of said transducer means for generating a pair of rapid-rise pulses of some polarity at a pair of outputs thereof whenever said pair of electrical signals cross a zero datum potential in a predetermined potential direction, respectively;
    means connected to one of the outputs of said tunnel diode switch means for producing a sweep signal in response to each of the pulses therefrom;
    means connected to the other of the outputs of said tunnel diode switch means for delaying the pulses of same polarity therefrom a predetermined amount sufficiently to effect their occurrence at predetermined times during the generating of said sweep signals, respectively; and
    readout means having an intensity grid input, a reversed horizontal sweep input, and a vertical sweep input, with the reversed horizontal sweep input thereof connected to the output of said sweep signal producing means, and with the intensity grid input thereof effectively connected to the output of the aforesaid delaying means.

2. The device of claim 1 wherein said transducer means responsive to predetermined received wave energy for generating a pair of electrical signals having a phase relation which varies in accordance with the direction from which said wave energy is propagating relative to a predetermined axis of directivity comprises:
    a first receiving transducer;
    a second receiving transducer contiguously disposed with said first receiving transducer in such manner that each thereof is located a predetermined equal distance from said axis of directivity and is in line with the other.

3. The device of claim 1 wherein said means connected to one of the outputs of said tunnel diode switch means for producing a sweep signal in response to each of the pulses of same polarity therefrom comprises a sawtooth signal generator.

4. The device of claim 1 wherein said means connected to the other of the outputs of said tunnel diode switch means for delaying the pulses of same polarity therefrom a predetermined amount sufficient to effect their occurrence at predetermined times during the generation of said sweep signals, respectively, comprises a variable delay line.

5. The device of claim 1 wherein said readout means having an intensity grid input, a reversed horizontal sweep input, and a vertical sweep input, with the reversed horizontal sweep input thereof connected to the output of said sweep signal producing means, and with the intensity grid input thereof effectively connected to the output of the aforesaid delay means comprises a cathode ray tube.

6. The invention according to claim 1 further characterized by:
    a pair of time-varied-gain amplifiers respectively connected to the outputs of said transducer means; and
    a pair of filters respectively connected between outputs of said pair of time-varied-gain amplifiers and the inputs of the aforesaid tunnel diode switch means.

7. The invention according to claim 1 further characterized by:
    means for broadcasting the aforesaid predetermined wave energy toward a target whose bearing is to be determined; and
    means connected between said predetermined wave energy broadcasting means and the vertical sweep input of said readout means for the synchronization thereof therewith.

8. A sonar system comprising in combination:
    a pair of receiving transducers, each of which is faced normal to a predetermined first axis, and each of which is disposed a predetermined distance from the other and an equal distance from a second axis that is perpendicular to the aforesaid predetermined first axis;
    a pair of time-varied-gain amplifiers respectively connected to the outputs of said pair of receiving transducers;
    a pair of filters respectively connected to the outputs of said time-varied-gain amplifiers;
    a pair of tunnel diode switch means connected to the outputs of said pair of filters for respectively generating a pair of rapid-rise marker pulses of the same polarity whenever predetermined zero-crossing portions of an acoustical wavefront impacts upon said pair of receiving transducers;
    means connected to one of the outputs of said pair of tunnel diode switch means for producing a predetermined sawtooth sweep signal in response to each of the marker pulses therefrom;
    variable means connected to the other of the outputs of said pair of tunnel diode switch means for delaying the marker pulses therefrom a predetermined amount;
    variable means connected to the output of said variable delaying means for amplifying said delayed marker pulses; and
    a readout means having an intensity input, a vertical sweep input, and a horizontal sweep input with the horizontal sweep thereof displayed in a direction that is in opposition with the disposition of said pair of receiving transducers relative to said second axis, with the horizontal sweep thereof connected to the output of said sawtooth sweep signal producing means, and with the intensity input thereof connected to the output of the aforesaid variable amplifying means.

9. The invention according to claim 8 further characterized by:
    a clock pulse generator;
    a control voltage generator connected between the output of said clock pulse generator and the control inputs of said time-varied-gain amplifiers;
    a vertical sweep generator connected between the output of said clock pulse generator and the vertical sweep input of said readout means;
    a transmitter connected to the output of said clock pulse generator; and a transmitting transducer connected to the output of the aforesaid transmitter.

References Cited

UNITED STATES PATENTS

| | | | |
|---|---|---|---|
| 2,166,991 | 7/1939 | Guanella | 340—6 X |
| 3,024,441 | 3/1962 | Saxton | 340—3 X |
| 3,078,415 | 2/1963 | Frelich | 324—88 |
| 3,084,331 | 4/1963 | Dudley | 340—3 |

RICHARD A. FARLEY, Primary Examiner

U.S. Cl. X.R.

324—88; 340—6, 16; 343—11, 113